United States Patent
Kuhnle et al.

(10) Patent No.: US 6,691,799 B2
(45) Date of Patent: Feb. 17, 2004

(54) TOOL HOLDER

(75) Inventors: Axel Kuhnle, Freiberg (DE); Helmut Wanek, Bietigheim-Bissingen (DE); Richard Engel, Sebnitz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/151,418

(22) Filed: May 20, 2002

(65) Prior Publication Data

US 2002/0179310 A1 Dec. 5, 2002

(30) Foreign Application Priority Data

Jun. 2, 2001 (DE) .......................................... 101 27 103

(51) Int. Cl.$^7$ ................................................. B23Q 3/00
(52) U.S. Cl. .......................... 173/132; 173/29; 279/19; 279/19.5; 279/19.6; 279/62; 408/238; 408/239 R
(58) Field of Search ........................... 173/47, 48, 104, 173/109, 114, 132, 29; 279/19, 19.3, 19.4, 19.5, 19.6, 75, 62; 408/238, 239 R

(56) References Cited

U.S. PATENT DOCUMENTS

| | | | | |
|---|---|---|---|---|
| 4,585,077 A | * | 4/1986 | Bergler ........................ 173/48 |
| 4,775,159 A | * | 10/1988 | Manschitz ................. 279/19.3 |
| 4,824,298 A | * | 4/1989 | Lippacher et al. .......... 408/240 |
| 4,898,250 A | * | 2/1990 | Neumaier et al. ............ 173/48 |
| 4,998,588 A | * | 3/1991 | Manschitz .................... 173/47 |
| 5,016,892 A | * | 5/1991 | Lafforgue et al. ............ 279/82 |
| 5,199,833 A | * | 4/1993 | Fehrle et al. ........... 408/239 R |
| 5,375,665 A | * | 12/1994 | Fanchang et al. ............. 173/48 |
| 5,505,271 A | * | 4/1996 | Bourner ........................ 173/48 |
| 5,702,112 A | * | 12/1997 | Brannstrom et al. .......... 279/19 |
| 5,704,433 A | * | 1/1998 | Bourner et al. ............... 173/48 |
| 5,711,380 A | * | 1/1998 | Chen ............................ 173/48 |
| 5,842,527 A | * | 12/1998 | Arakawa et al. .............. 173/48 |
| 6,142,242 A | * | 11/2000 | Okumura et al. ............. 173/48 |
| 6,192,996 B1 | * | 2/2001 | Sakaguchi et al. ............ 173/48 |
| 6,241,026 B1 | * | 6/2001 | Wache et al. ............... 173/132 |
| 6,513,604 B2 | * | 2/2003 | Hanke ......................... 173/48 |
| 6,536,780 B2 | * | 3/2003 | Baumann et al. .......... 279/19.4 |
| 6,536,782 B2 | * | 3/2003 | Röhm .......................... 279/62 |

FOREIGN PATENT DOCUMENTS

| | | | | |
|---|---|---|---|---|
| DE | 330 8 034 A1 | * | 9/1984 | ........... B25D/17/08 |
| DE | 35 16 541 A1 | * | 11/1986 | ............ B28D/1/14 |
| DE | 196 21 610 A1 | | 12/1997 | |

* cited by examiner

Primary Examiner—Rinaldi L. Rada
Assistant Examiner—Gloria R. Weeks
(74) Attorney, Agent, or Firm—Michael J. Striker

(57) ABSTRACT

A tool holder for a power tool, such as a drill hammer, a chisel hammer, and both, includes a striking mechanism for strikingly driving a tool, a base body, a drive part on which the base body is releasably mounted, at least one locking body for releasably mounting the base body on the drive part, a component having a throughgoing passage in which the at least one locking body is arranged, a securing body which radially fixes the at least one locking body in its engaging position, an actuating element for unlocking the securing body from its locking position to an unlocking position for radially reieasing the at least one locking body, and at least one holding element which holds the at least one locking body in the unlocking position of the securing body in the throughgoing passage. The holding element is lowered or lowerable into the component having the throughgoing passage and is overrun by the securing body.

11 Claims, 4 Drawing Sheets

TOOL HOLDER

BACKGROUND OF THE INVENTION

The present invention relates to tool holders.

German patent document DE 196 21 610 A1 discloses a tool holder for a power tool, in particular for an electrical drill hammer. The drill hammer has a spindle sleeve, in which a base body of the tool holder is insertable and lockable by locking bodies. The locking bodies are releasably held in passages of the spindle sleeve by a spring ring and are radially overlapped by a securing body in a locking position. The spring ring which holds the locking bodies extends radially over a guiding surface of the spindle sleeve, on which the securing body is guided, and limits them in their axial movement.

For removing the tool holder, the securing body is displaced via an actuating sleeve axially to a position in which the locking bodies are radially released.

SUMMARY OF THE INVENTION

Accordingly, it is an object of the present invention to provide a tool holder of the above mentioned general type, which is a further improvement of the existing tool holders.

In accordance with the present invention a tool holder is provided for a hand power tool, in particular for a drill-and/ or chisel hammer with a striking mechanism which drives a tool, and with a base body which is releasably mountable on a drive part through at least one locking body arranged in a throughgoing passage of a component and radially fixable in its engaging position by a securing body, which is guided by an actuating element for unlocking from its locking position to an unlocking position radially releasing the locking body, wherein the locking body is held by at least one holding element in the unlocking position of the securing body in the throughgoing passage.

It is proposed that the holding element is lowered or lowerable in the component which has the throughgoing passage and is overrun by the securing body. It is advantageous to provide a significant overlapping of the locking body by the securing body and thereby a particularly secure hold of the tool holder on the drive part. The holding element can be pressed by the securing body into a recess during overrunning or can advantageously be lowered completely in a recess, whereby friction between the holding element and the securing body can be avoided.

The holding element can be composed of various components which are suitable for the person skilled in the art, such as for example a pin and the like. It is advantageous when the holding element is formed as a spring ring arranged in a groove. Several locking bodies can be held by a spring ring in several throughgoing passages. In addition a spring ring is very simple and fast for mounting and dismounting.

For avoiding the situation that a gap of the holding element formed as a spring ring comes to abutment in the region of a locking body, it is advantageous to hold it by a rotation-securing ring in a peripheral direction. The rotation-securing ring can be also composed of components which are known for a person skilled in the art, for example of an additional beam which engages radially in the ring. It is especially advantageous when the rotation securing ring is formed as a hook provided on the holding element and a recess provided on the component which has the throughgoing passage. In the mounting condition of the holding element the hook engages in the recess. Additional components, mounting expenses and costs can be therefore avoided.

The securing ability of the spring ring is further increased and possibly a rotation-securing ring can be dispensed with when the spring ring has a gap which is smaller than the locking bodies. In conventional drill and chisel hammers the gap preferably is smaller than 3 mm.

Advantageously a holding element is arranged in an axial direction before and after the locking bodies, and therefore a tolerance, non sensitive secure hold can be provided. When each spring ring is provided with a rotary securing component, the spring rings advantageously can be held in positions which are turned relative to one another. The weak points of a spring ring because of a gap can be compensated by the other spring ring.

In accordance with a further embodiment of the present invention it is proposed that the securing body is limited in its movement in an axial direction opposite to the unlocking direction, by an abutment element arranged on the component having the throughgoing passage. With the abutment of the securing body against the abutment element the locking body is held in its engaging position via the securing body. The securing body is basically held opposite to the unlocking direction via the actuating element. When the actuating element is damaged so that the securing body no longer can be held, then the abutment element guarantees a required operation.

It is further proposed that the securing body can be displaceable by a corresponding component during displacement of the tool holder on the drive part to its unlocking position against a spring force of the spring element. The securing body can be also held releasably on the drive part and moved by the actuating element in a displacement direction of the tool holder against the spring force of a spring element to its unlocking position. The actuation of the actuating element for unlocking the securing body of the tool holder is oriented preferably opposite to an idle running pulse acting in the actuation direction. Thereby an automatic release is reliably prevented and in particular in high power drill and chisel hammers a secure mounting of the removable tool holder can be guaranteed.

The securing body can be deviated automatically to its unlocking position by the arrangement on the drive part preferably with mounting of the tool holder by a component on the tool holder. An unlocking movement of the securing body during automatic unlocking can be performed preferably in the same direction against the direction of the pressure spring during automatic unlocking for mounting of the tool holder on the drive part and an unlocking movement of the securing body during manual unlocking for release of the tool holder from the drive part.

The base body of the tool holder can include at least a part of the drive part in the mounted condition, and thereby a particularly robust and structurally simple design can be provided. A gap seal can be formed between an anvil of the striking mechanism and the drive part and protect a drive unit of the hand power tool from dirt. A reduced wear can be obtained and damages during insertion of the tool can be avoided. Furthermore, the locking bodies can be supported advantageously in the base body of the tool holder. Thereby the locking bodies when needed can be easily replaced or exchanged with the tool holder. Basically, the locking bodies can be held on the drive part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
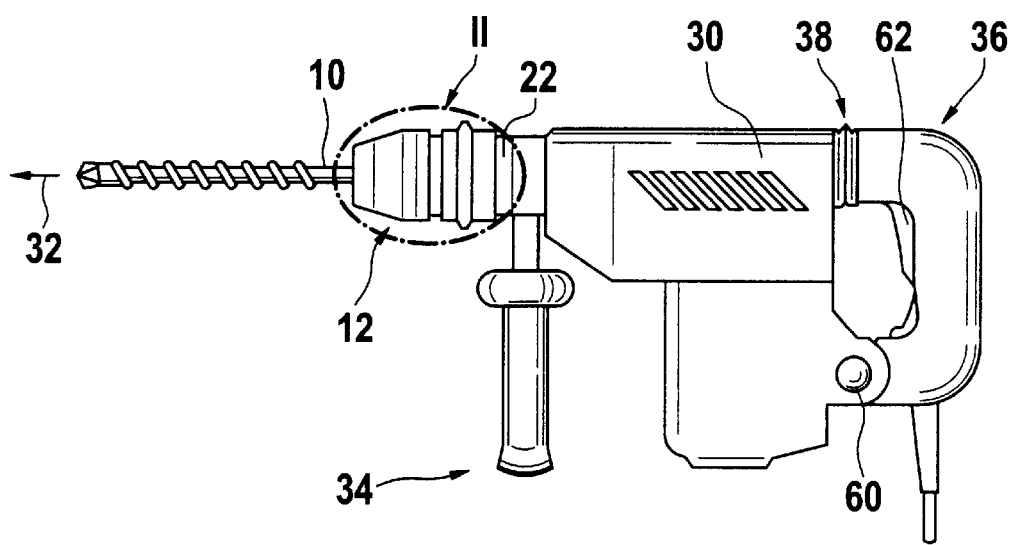
FIG. 1 is a view schematically showing a drill hammer in accordance with the present invention.

FIG. 1 shows a drill hammer with an electric motor which is located in a housing 30 and is not shown in the drawings, and also with a transmission and striking mechanism. The striking mechanism drives a tool 10 which is clamped in a tool holder 12, for example a clamped drill to perform a rotating and striking action. A first handle 34 which extends perpendicular to an actuating direction 32 is mounted on the housing 30. It is arranged after the tool holder 12 opposite to the actuation direction 32.

A second bracket-shaped handle 36 extends perpendicular to the actuating direction 32 on a side of the housing 30 which is opposite to the tool 10. At its first end which faces away from the tool axis it is connected by a hinge 60 with the housing 30, with a turning axis extending transversely to the actuating direction 32. The handle 36 is connected with the housing 30 at a second end through an insulating device 38. An actuating switch 62 formed as a switching rocker is arranged on the handle 36.

Figure 2:
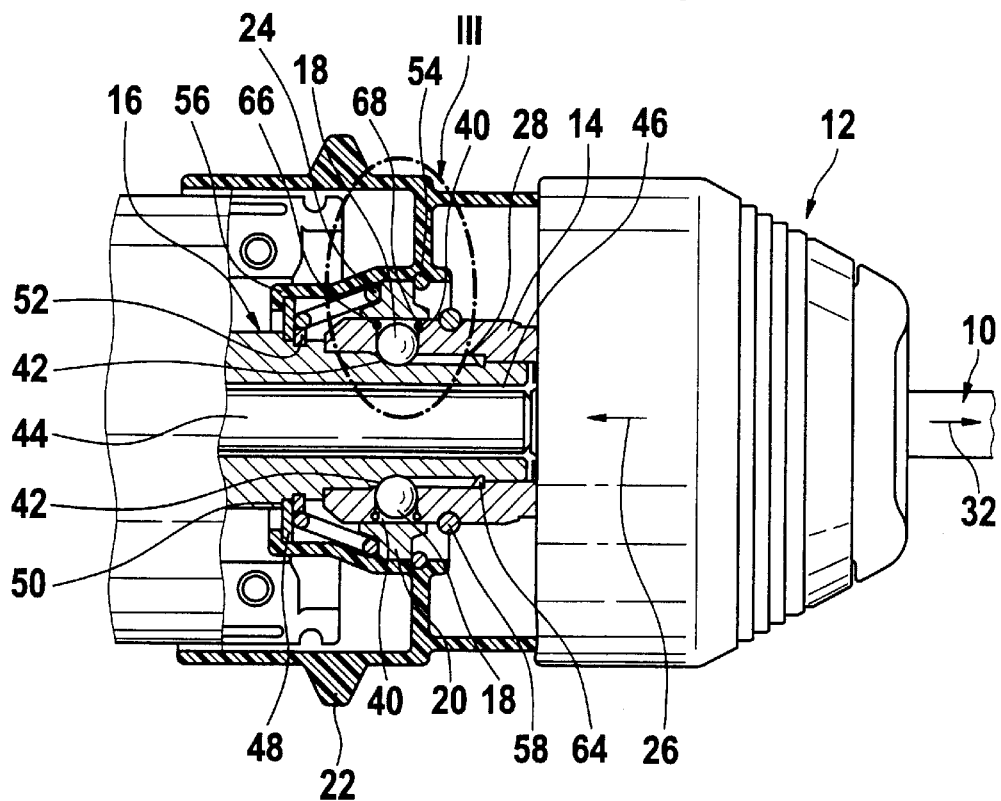
FIG. 2 is a view showing a section II of the drill hammer of FIG. 1 with a removable tool holder in a partial section.

The tool holder 12 is mounted with its base body 14 releasably on a drive part 16 which is formed by a spindle pipe, through three locking bodies 18 which are uniformly distributed over the periphery as shown in FIG. 2. The base body has toward the drive part 16 a greater diameter than the drive part 16 and surrounds the latter. An anvil 44 of the not shown striking mechanism is arranged radially inwardly of the drive part 16. A gap seal 46 is formed between the anvil 44 and the drive part 16.

The locking bodies 18 which are formed as balls are arranged each in a corresponding throughgoing passages 40 in the base body 14 of the tool holder 12. They engage radially inwardly into calotte-shaped recesses 42 provided on the drive part 16. Instead of the calotte-shaped recesses, also a circumferential groove can be recommended. The calotte-shaped recesses 42 are arranged in the displacement direction 26 of the tool holder 12 after an outer toothing 28 formed on the drive part 16.

The locking bodies 18 are blocked by a ring-shaped securing body 20 or in other words fixed in their engaging position, which radially overlaps the locking bodies 18. Through the locking bodies 18, the base body 14 of the tool holder 12 is connected in an axial direction and in a rotary direction with the drive part 16. Furthermore, the base body 14 is fixedly connected with the drive part 16 in a rotary direction through an inner toothing 64 which is formed on the base body 14 and engages in the outer toothing 28 formed on the drive part 16.

Figure 5:
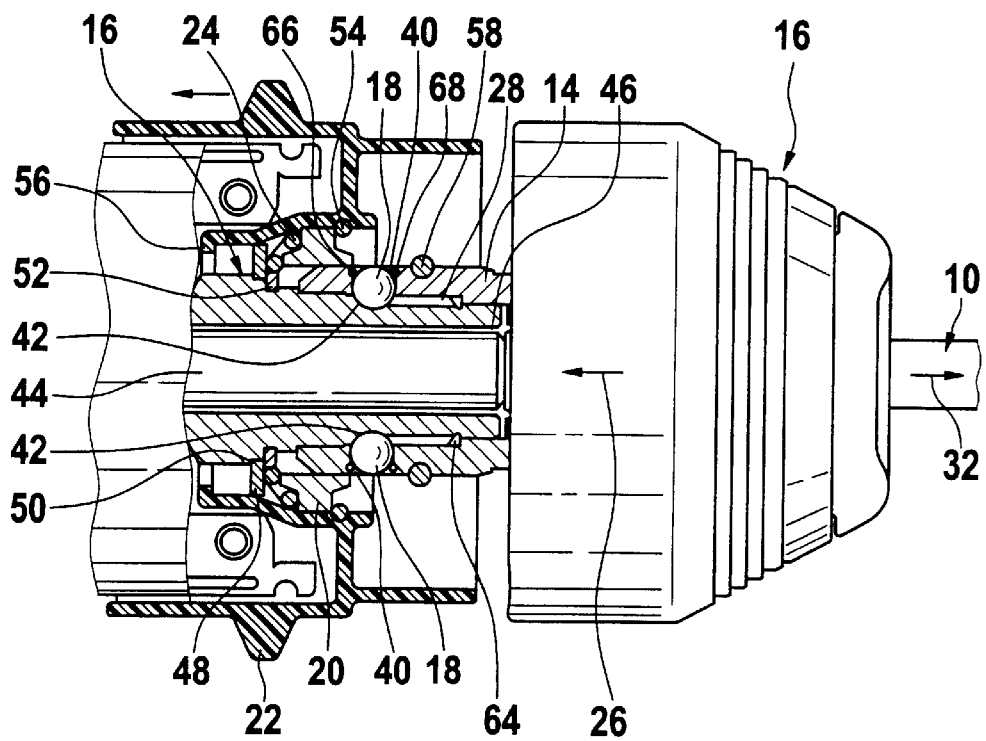
FIG. 5 is a view showing a tool holder of FIG. 2 in a manually unlocked condition.

The securing body 20 is held in a loose-proof manner on the drive part 16, and in particular inside a displacably supported actuating sleeve 22. For unlocking the tool holder 12, it is movable from its locking position by the actuation of the sleeve 22 in a displacement direction 26 of the tool holder 12 opposite to a spring force of a helical screw spring 24 to its unlocking position as shown in FIG. 5. The helical screw spring 24 is supported on a projection 50 of the drive part 16 with an end facing in the displacement direction 26, through a disc 48. The disc 48 is secured in the actuation direction 32 via a securing ring 52 on the drive part 16. With its second end, the helical screw spring 24 acts in the actuating direction 32 on the securing body 20, which at the side facing the tool 10 acts on its periphery in the actuating direction 32 on the actuating sleeve 22 through a spring ring 54. The sleeve 20 in the mounting condition of the tool holder 12 shown in FIG. 1 is supported in the actuating direction 32 on the drive part 16 with a collar 56 facing radially inwardly, through the disc 48 and the securing ring 52.

Figure 6:
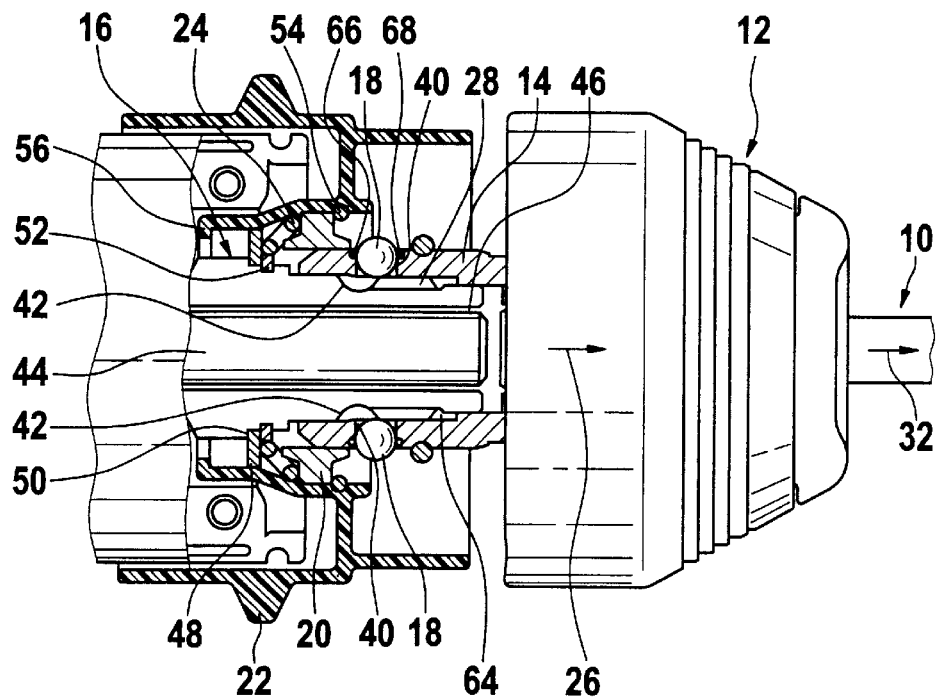
FIG. 6 is a view showing the tool holder of FIG. 2 during pull out from a drive part.

With a manual displacement of the actuating sleeve 22 in the displacement direction 26 for unlocking the tool holder 12, the securing body 20 is taken along through the spring ring 54 with the actuating sleeve 22 and is displaced against the helical pressure spring 24 to its unlocking position shown in FIG. 5. Subsequently the locking bodies 18 can deviate radially outwardly from the recesses 42 during pulling out of the tool holder 12 from the drive part 16 in the actuating direction 32 as shown in FIG. 6.

Figure 3:
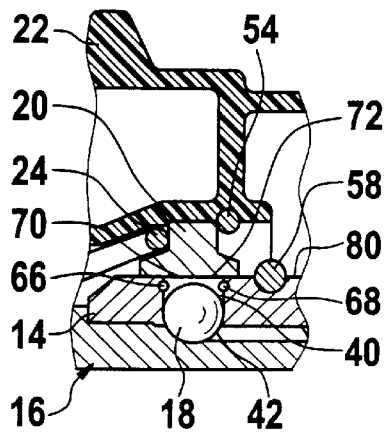
FIG. 3 is a view showing an increased fragment III of FIG. 2.

The locking bodies 18 are held releasably in the throughgoing passages 40 in the base body 14 of the tool holder 12. They are held radially inwardly by the narrowings of the throughgoing passages 40 and radially outwardly by two holding elements 66, 68 formed as spring rings, as shown in FIGS. 6 and 3.

The holding elements 66, 68 are arranged so that they are lowered in the base body 14 in an axial direction 32 before and after the locking bodies 18 correspondingly in a groove 70, 72. They are guided radially inwardly at a diameter of a guiding surface 80 of the base body 14 on the securing body 20, and can be overrun by the securing body 20 during unlocking and locking as shown in FIGS. 2 and 3.

The securing body 20 is provided on its inner radius with a greater width than its outer radius, and extends in a locking position over the throughgoing passages 40 with its radially inner, wider region in and opposite to the actuating direction 32. The locking bodies 18 are thereby held by the securing body 20 reliably in their engaging positions.

Figure 4:
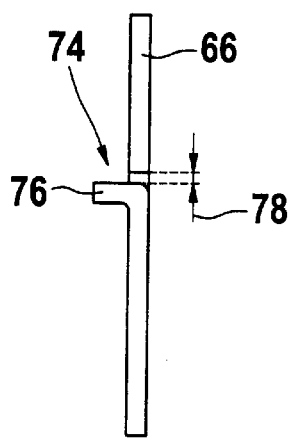
FIG. 4 is a view showing the holding element which is formed as a spring ring.

The holding elements 66, 68 formed as spring rings are mounted so that they are offset relative to one another by 180° and are held in the peripheral direction by a rotation securing ring 74. The rotation securing ring 74 includes a hook 76 which faces in an axial direction and is provided on the holding elements 66, 68, and a not shown axial opening provided on the base body 14, in which the hook 76 engages in a form-locking manner in the mounted condition of the holding elements 66, 68 as shown in FIG. 4. The holding elements 66, 68 formed as the spring rings have a gap 78 which is smaller than the ball-shaped locking bodies 18.

If during the operation the spring ring 54 must be released in the actuating sleeve 22 or the actuating sleeve 22 is damaged so that its holding function for the securing body 20 in the actuating direction 32 is lost, the securing body 20 is limited in its movement by an abutment element 58 which is formed on the base body 14 as a spring ring, in the axial direction which is opposite to the unlocking direction or in the actuating direction 32. With abutment of the securing body 20 against the abutment element 58, the locking bodies 18 are held by the securing body 20 in their engaging positions and an emergency operation is guaranteed. Instead of a spring ring also other components which are known for a person skilled in the art can be used, for example a collar formed on a base body, etc.

Figure 7:
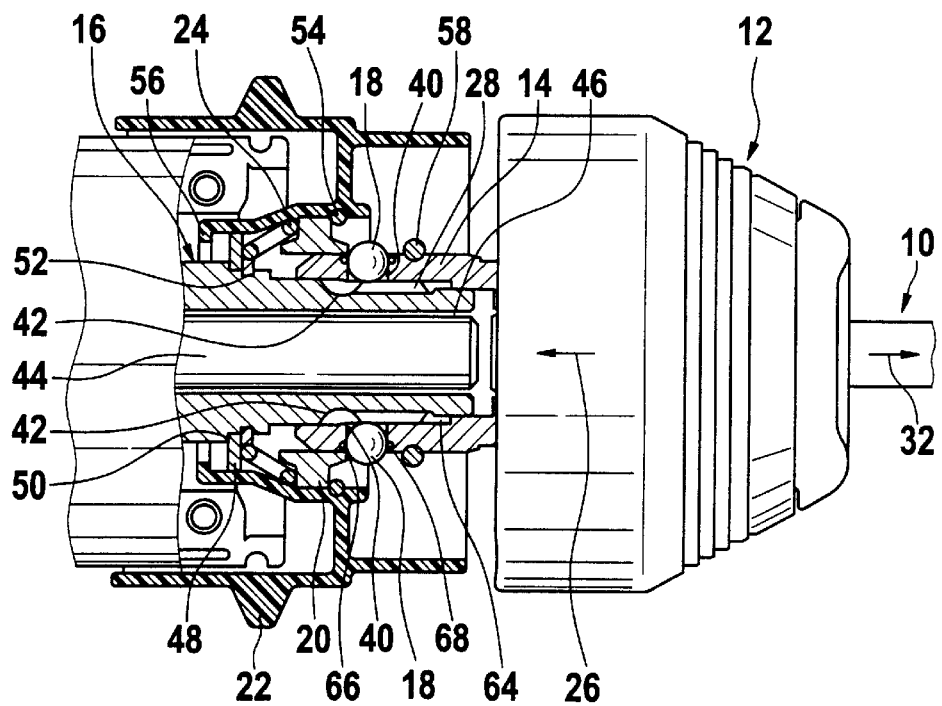
FIG. 7 is a view showing the tool holder of FIG. 2 during its displacement on the drive part.

During displacement of the base body 14 of the tool holder 12 in the displacement direction 26 on the drive part 16, the tool holder 12 is turned so far until the inner toothing 64 formed on the base body 14 can be brought in engagement with the outer toothing 28 formed on the drive part 16. The locking bodies 18 are deviated radially outwardly during the displacement by the outer toothing 28 of the drive part 16, and come to abutment with the securing body 20. With a progressing displacement movement, the securing body 20 is displaced by the locking bodies 18 to its unlocking position, and this is performed automatically without a manual actuation of the actuating sleeve 22 as shown in FIG. 7.

When the locking bodies 18 come to abutment over the calotte-shaped openings 42 in the drive part 16, they are deviated by the helical pressure spring 24 over the securing body 20 in the calotte-shaped recesses 42 radially inwardly. The helical pressure spring 24 displaces subsequently the securing body 20 to its locking position radially over the locking bodies 18, and the holding element 66, 68 are overrun in the actuating direction 32. The tool holder 12 is fixed on the drive part 16.

It will be understood that each of the elements described above, or two or more together, may also find a useful application in other types of constructions differing from the types described above.

While the invention has been illustrated and described as embodied in tool holder, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tool holder for a power tool formed as a hammer selected from the group consisting of a drill hammer, a chisel hammer, and both, the tool holder comprising a striking mechanism for strikingly driving a tool; a base body; a drive part on which said base body is releasably mounted; at least one locking body for releasably mounting said base body on said drive part; a component having a throughgoing passage in which said at least one locking body is arranged; a securing body which radially fixes said at least one locking body in its engaging position; an actuating element for unlocking said securing body from its locking position to an unlocking position which radially releases said at least one locking body; at least one holding element which holds said at least one locking body in the unlocking position of said securing body in said throughgoing passage, said holding element being lowered or lowerable into said component having said throughgiong passage and being overrun by said securing body.

2. A tool holder as defined in claim 1, wherein said holding element is formed as a spring ring arranged in a groove.

3. A tool holder as defined in claim 2, and further comprising a rotation-securing means which holds said holding element in a peripheral direction.

4. A tool holder as defined in claim 3, wherein said rotation-securing means include a hook formed on said holding element and a recess provided in said component having said throughgoing passage, on which said hook is engaged in a mounted condition of said holding element.

5. A tool holder as defined in claim 2, wherein said holding element which is formed as said spring ring has a gap which is smaller than said at least one locking body.

6. A tool holder as defined in claim 1, wherein said holding element is arranged in an axial direction before and after said at least one locking body.

7. A tool holder as defined in claim 1, and further comprising an abutment element arranged on said component having said throughgoing passage so that said securing body is limited by said abutment element in its movement in an axial direction which is opposite to the unlocking direction, and during abutment of the securing body against said abutment element said at least one locking body is held by said securing body in its engaging position.

8. A tool holder as defined in claim 1, and further comprising a spring element arranged so that said securing body is displaceable during displacement of the tool holder on said drive part to its unlocking position, opposite to a spring force of said spring element, said securing body being held on said drive part releasably and is movable by said actuating element in a displacement direction of the tool holder opposite to the spring force of said spring element to the unlocking position.

9. A tool holder as defined in claim 8, wherein said body in a mounted condition surrounds at least a part of said drive part.

10. A tool holder as defined in claim 9, wherein said at least one locking body is held releasably in said base body.

11. A power tool, comprising a housing; and a tool holder for holding a tool; a striking mechanism for strikingly driving the tool; a base body; a drive part on which said base body is releasably mounted; at least one locking body for releasably mounting said base body on said drive part; a component having a throughgoing passage in which said at least one locking body is arranged; a securing body which radially fixes said at least one locking body in its engaging position; an actuating element for unlocking said securing body from its locking position to an unlocking position which radially releases said at least one locking body; at least one holding element which holds said at least one locking body in the unlocking position of said securing body in said throughgoing passage, said holding element being lowered or lowerable into said component having said throughgoing passage and being overrun by said securing body.

* * * * *